United States Patent [19]

Mizen

[11] 4,030,853
[45] June 21, 1977

[54] DRILL APPARATUS

[76] Inventor: Neil J. Mizen, 1603 Greenmount St., Rockford, Ill. 61107

[22] Filed: July 30, 1976

[21] Appl. No.: 709,960

[52] U.S. Cl. .................................. 408/10; 408/46; 408/52; 408/100; 408/111

[51] Int. Cl.² .................. B23B 39/18; B23B 47/18

[58] Field of Search .................. 408/46, 52, 10, 22, 408/24, 99, 110, 111; 83/456

[56] References Cited

UNITED STATES PATENTS

| | | | |
|---|---|---|---|
| 3,804,544 | 4/1974 | Adams | 408/110 X |
| 3,892,154 | 7/1975 | Duffy | 408/46 X |

*Primary Examiner*—Willie G. Abercrombie
*Attorney, Agent, or Firm*—Morsbach & Pillote

[57] ABSTRACT

A drill apparatus including a stationary support frame, a drill carriage mounted on the stationary support frame for movement relative thereto along a generally horizontal path, a drill head mounted on the carriage and having a drill rotatable about an axis paralleling the horizontal path, a work engaging head mounted on the drill head for movement relative thereto along a feed path paralleling the horizontal path of movement of the carriage, and feed mechanism connected to the drill head and to the work engaging head for selectively moving the latter toward and away from the drill head. The drill head and work engaging head are adjustable as a unit in a vertical direction relative to the carriage to vertically position the drill and work engaging head. The relative positions of the work engaging head and drill head are sensed to control the direction and speed of relative movement of the work engaging head relative to the drill head.

21 Claims, 5 Drawing Figures

DRILL APPARATUS

BACKGROUND OF THE INVENTION

In conventional apparatus for drilling holes in a workpiece, the workpiece is clamped to a workpiece support on the base of the drill apparatus and the drill head is mounted for movement along its base toward and away from the workpiece support to drill the holes in the workpiece. While such apparatus worked well with workpieces that are small enough to be easily moved to proper position and clamped on the workpiece support, they are not entirely satisfactory for use with very large workpieces such as structural beams and the like. Such large workpieces cannot be readily moved to accurately position the same relative to the drill axis. Moreover, in such apparatus the stresses incurred during a drilling operation are transmitted through a stress path that includes the workpiece clamp, the workpiece support, the drill base and the drill head. It is therefore necessary to provide relatively heavy clamps for clamping the workpiece to the workpiece support as well as a heavy base and drill head supporting structure.

SUMMARY OF THE INVENTION

The present invention relates to an apparatus for drilling holes in a workpiece and particularly to an apparatus for drilling holes in relatively large workpieces such as structural members.

An important object of this invention is to provide a drill apparatus particularly adapted for drilling holes in relatively large workpieces and which does not require a massive drill support frame or heavy workpiece clamp structure.

Another object of this invention is to provide a drill apparatus which provides a short stress path between the workpiece engaging member and the drill to thereby reduce the number and the size of the parts being stressed during the drilling operation.

A further object of this invention is to provide a drilling apparatus in which the relative position of the drill and workpiece can be accurately sensed to control the speed and direction of movement of the drill.

Still another object of this invention is to provide a drill apparatus in which the drill can be rapidly and accurately positioned relative to the workpiece to enable rapid and accurate drilling of holes at different locations along the workpiece.

Still another object of this invention is to provide a drill apparatus in which it is relatively easy and convenient to sense when the drill is about to break through the far side of the workpiece.

Accordingly, the present invention provides an apparatus for drilling holes in a workpiece which includes a stationary support frame having apparatus for locating the workpiece relative to the frame, a drill carriage mounted on the support frame for movement relative thereto along a linear path, a drill head mounted on the carriage and having a drill rotatable about an axis paralleling the linear path, a work engaging head having a work engaging face opposing the drill, and a feed mechanism connected to the drill head and to the work engaging head for selectively moving the latter along the feed path in drill feeding and drill retracting directions. The feed mechanism is operative in the drill feed direction to bring the drill and the work engaging face on the work engaging head into engagement with opposite faces of the workpiece and to thereafter advance the drill into the workpiece, and the drill carriage is freely movable along the linear path relative to the support frame when the feed mechanism moves the work engaging head relative to the drill head into engagement with the workpiece.

The drill apparatus also advantageously includes mechanism for sensing the relative positions of the work engaging head and the drill head for controlling the direction and rate of movement of the drill head. Apparatus is also advantageously mounted on the work engaging head for deburring the hole formed in the workpiece by the drill. The drill head and work engaging head are advantageously supported for movement relative to the carriage in a direction crosswise of the path of movement of the carriage for positioning of the drill head and work engaging head relative to the workpiece.

These together with objects, features and advantages of the present invention will be more readily understood by reference to the following detailed description, when taken in connection with the accompanying drawings wherein:

FIG. 5 is a plan view of the position sensing apparatus for sensing the relative positions of the drill head and work engaging head.

Figure 1:
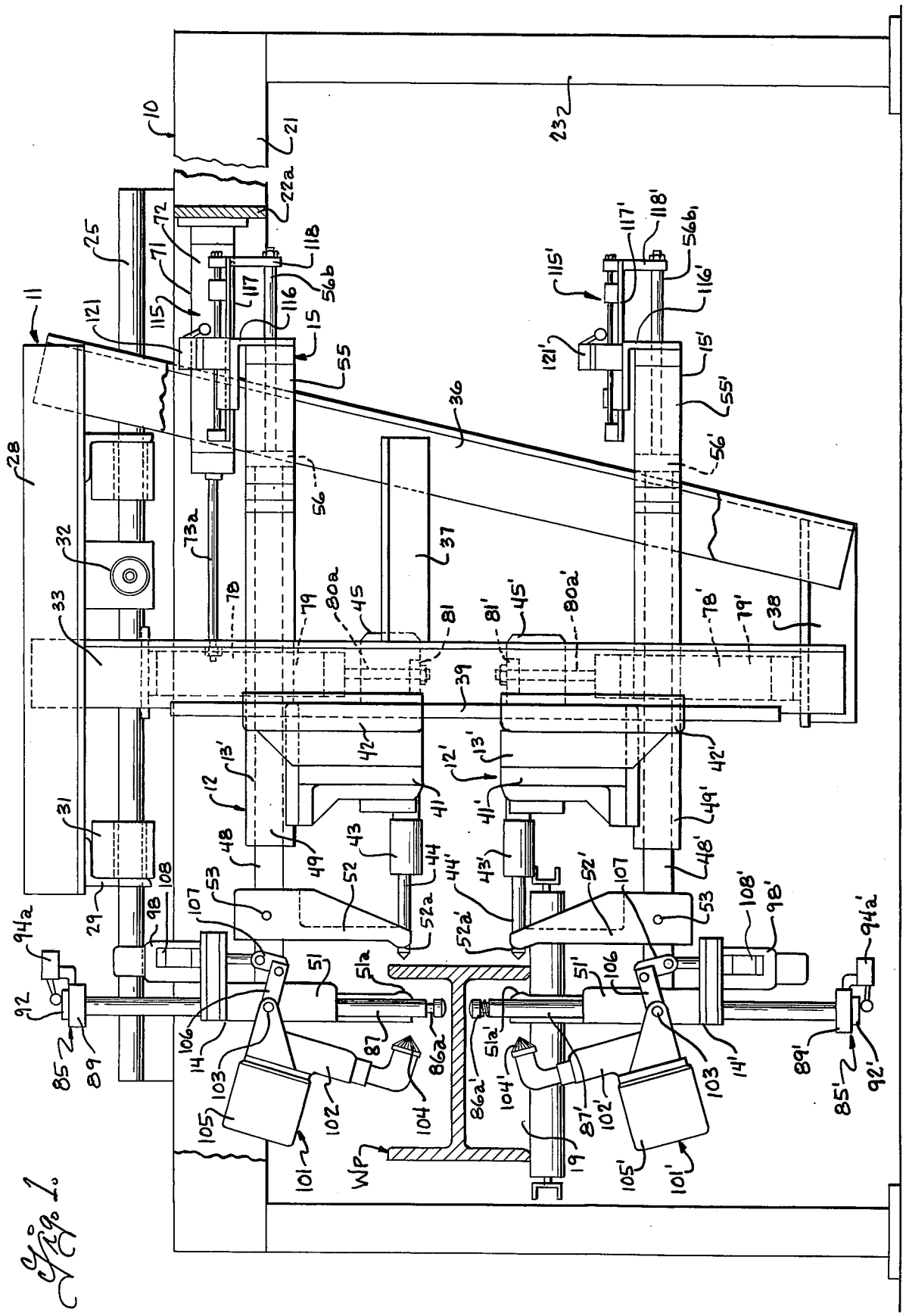
FIG. 1 is a side elevational view of the drill apparatus with parts broken away and shown in section to illustrate details of construction.
Figure 2:
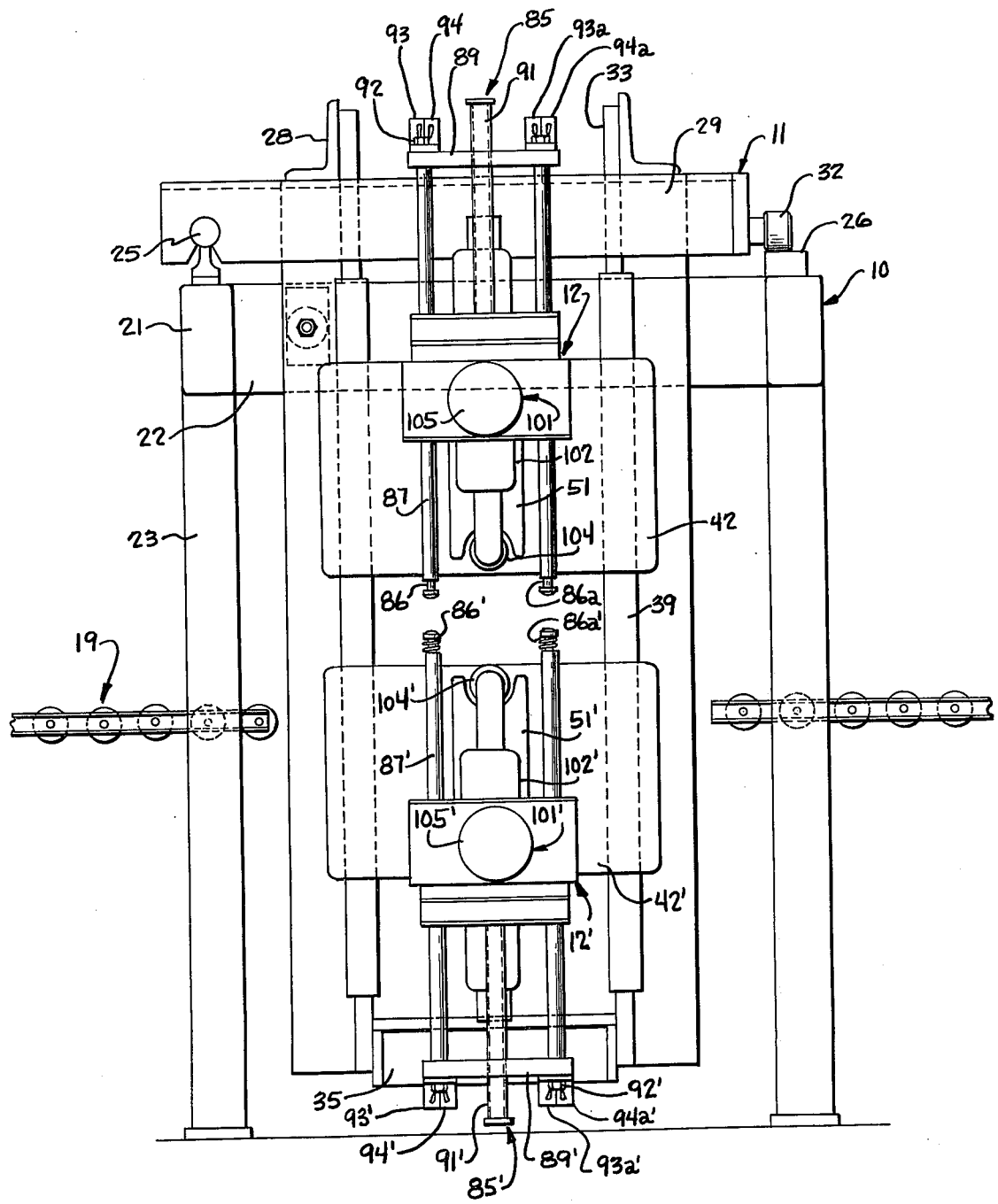
FIG. 2 is a front elevational view of the drill apparatus.

Referring now more specifically to FIGS. 1 and 2, the drill apparatus in general includes a support frame 10, a drill carriage 11 mounted on the support frame for movement relative thereto along a generally horizontal path, and upper and lower drill units 12 and 12' mounted on the carriage. It is contemplated that a single drill unit can be utilized. However, in drilling some structural members such as I-beams, it is advantageous to provide a pair of drill units with the upper drill 12 unit arranged to engage an upwardly extending flange or part of the structural member and the lower drill unit 12' arranged to engage a downwardly extending flange or part of the structural member. The workpiece designated WP, herein shown in the form of an I-beam, is mounted on the workpiece support 19 with the flange or flanges of the workpiece to be drilled extending generally perpendicular to the path of movement of the carriage on the support frame. The upper and lower drill units are of like construction, and like numerals followed by the postscript (') are used to designate parts on the lower drill unit corresponding to those on the upper drill unit. The drill units include drill heads 13, 13' and work engaging heads 14, 14' mounted on the respective drill head for movement relative thereto along a feed path paralleling the path of movement of the carriage, and feed mechanisms 15, 15' for relatively moving the respective work engaging head and drill head to bring the work engaging head and drill into engagement with opposite sides of the workpiece and to thereafter advance the drill into the workpiece. The carriage 11 with the drill units 12, 12' is movable relative to the support frame 10 to position the drill units in a direction crosswise of the workpiece, and the drill units are advantageously mounted for vertical adjustment relative to the carriage to vertically position the drill units relative to the workpiece.

The stationary support frame 10 need only be sufficiently strong to support the carriage 11 and the drill units and accordingly it can be of relative light weight construction. As shown, the support frame includes longitudinal frame members 21 which are spaced apart by cross frame members 22 and supported on posts 23. A horizontal guideway is provided on the stationary frame member and includes a guide bar 25 at one side of the frame and the guideway 26 at the other side of the frame. The carriage 11 includes longitudinal and cross frame members 28 and 29 which are rigidly interconnected and followers 31 and rollers 32 which are respectively guidably mounted on the guide bar 25 and guideway 26. The drill units 12 and 12' are preferably suspended below the carriage and, for this purpose, vertical carriage members 33 are secured at their upper ends to the longitudinal carriage members 28 and are interconnected at their lower ends by a cross member 35. Brace members 36 are secured at their upper ends to the longitudinal carriage members 28 and are connected intermediate their ends and at their lower ends by brackets 37 and 38 to the vertical carriage members 33 to brace the same. Vertical guideways 39 are provided on the forward edges of the vertical carriage members 33.

The drill heads 13, 13' respectively include housing 41, 41' having guides 42, 42' that slidably engage the guideways 39 on the carriage to support the drill units for vertical adjustment relative to the carriage. The housings 41, 41' have one or more drill chucks 43, 43' rotatably mounted therein for rotation about an axis paralleling the path of movement of the carriage and drills 44, 44' are mounted in the chucks. The drill chucks are connected either directly or through gearing (not shown) in the housings to drill motors 45, 45' mounted at the rear side of the housings.

The work engaging heads 14, 14' are supported on the respective drill heads 13, 13' for movement along a feed path paralleling the path of movement of the carriage. As shown in FIG. 1, the work engaging heads 14, 14' are secured to the ends of rods 48, 48' that are slidably supported in guide tubes 49, 49' in the housings 41, 41' of the drill heads. The work engaging heads 14, 14' respectively include members 51, 51' having work engaging faces 51a, 51a' which are opposed to the drills 44, 44' and which are arranged to engage a surface on the workpiece which is opposed to the surface engaged by the drill. The members 51, 51' are preferably formed with a bifurcated lower end as shown in FIG. 2 so as to straddle the axis of the drills 44, 44' and engage a rear surface of the workpiece at two points spaced apart lengthwise of the workpiece and on relatively opposite sides of the drill axis. In this manner, the work engaging member does not interfere with passage of the drill through the workpiece and, moreover, at least one of the work engaging surfaces will engage the rear facing surface of the workpiece when drilling holes adjacent the end of the workpiece. The work engaging heads 14, 14' also include a second member 52, 52' secured to the rods 48, 48' for movement with the first work engaging member 51 and which is preferably adjustably locked thereto as by a set screw 53. The second work engaging members 52, 52' have a bifurcated lower end that straddles the drill 44 and which define a pair of work engaging faces 52a, 52a' opposed to the work engaging faces 51a, 51a' and arranged to engage the forward facing surface of the workpiece. The work engaging members 51, 51' and 52, 52' are adjusted so that their work engaging faces 51a and 52a are spaced apart a distance somewhat greater than the thickness of the part of the workpiece to be drilled, as best shown in FIG. 1.

The feed means 15, 15' for moving the work engaging heads 14, 14' toward and away from the respective drill heads 13, 13' comprise linear hydraulic feed actuators respectively having a cylinder 55, 55' and pistons 56, 56'. The cylinders are connected as through guide tubes 49, 49' to the respective drill head and the pistons 56, 56' are connected to the rods 48, 48' to move the work engaging heads relative to the drill heads. The fluid control means for controlling the flows of fluid to and from the cylinders 55, 55' of the feed mechanisms 15, 15' is described more fully hereinafter.

The carriage 11 could be moved manually along the guideways relative to the stationary support frame 10 to position the work engaging members 51 and 52 of the heads 14, 14' at relatively opposite sides of the parts of the workpiece to be drilled. However, a power operated mechanism is advantageously provided for selectively shifting the carriage relative to the frame and, for this purpose, a linear hydraulic carriage actuator 71 is operatively connected to the carriage and to the stationary support frame for moving the carriage along the frame. The actuator 71 includes a cylinder 72 secured to a cross member 22a on the stationary support frame and a piston 73 (FIG. 3) disposed in the cylinder and having a rod 73a extending out of the cylinder and connected to the carriage 11. A fluid control means for the carriage actuator 71 to enable selective shifting of the carriage relative to the frame, is also described more fully hereinafter.

Vertical adjustment of the drill units 12, 12' relative to the carriage could also be effected manually. However, a power operated mechanism is also advantageously provided for selectively vertically adjusting the drill units 12 and 12'. This power operated mechanism includes upper and lower linear hydraulic actuators 78, 78' respectively including cylinders 79, 79' connected to the carriage and pistons 80, 80' having rods 80a, 80a' connected to bracket 81, 81' on the respective drill head housing for moving the same along the vertical guideways 39. A fluid control means described more fully hereinafter is provided for controlling the flow of fluid to the upper and lower actuators 78, 78', and workpiece sensors 85, 85' are provided for sensing the vertical position of the drill units. The upper and lower workpiece sensors 85, 85' are of similar construction and include at least one and preferably a pair of vertical sensing rods designated 86, 86a and 86', 86a' horizontally offset to relatively opposite sides of the center line of the drill so that at least one rod engages the workpiece, when drilling a hole adjacent the end of the workpiece. The rods are mounted for vertical sliding movement in tubes 87, 87', which tubes are, in turn, mounted for vertical sliding movement in the respective work engaging heads 14, 14'. The tubes 87, 87' are interconnected at their outer ends by cross heads 89, 89' and externally threaded shafts 91, 91' threadedly engage the cross heads as best shown in FIG. 2. Shafts 91, 91' are operative when rotated to raise and lower the respective cross heads 89, 89' and hence the tubes 87, 87'. The position sensing rods 86 have a head such as a nut 92, 92' at their outer ends which engage the respective cross head, and the rods have a length somewhat longer than the tubes so as to normally project beyond the ends of the tubes as shown in FIGS. 1 and 2. Switches 93, 94 and 93a, 94a are mounted on the upper cross head 89 and have a switch actuators positioned to engage the heads 92 on the upper ends of the rods 86, 86a whereby the switches are actuated when the lower ends of the position sensing rods 86, 86a engage the workpiece. Similarly, switches 93', 94' and 93a', 94a' are mounted on the lower cross head 89' and have switch actuators positioned to engage the heads 92' on the lower ends of rods 86, 86a' whereby the switches are actuated when the upper ends of the rods 86', 86a' engage the workpiece. The screw shafts 91, 91' could be manually rotated if desired. However, in the preferred embodiment, a power operated mechanism is provided for rotating the screw shaft 91, 91' to adjust the position sensing rods. For this purpose, motors 98, 98' are connected through gears in a gear box 99 to the lower end of the shaft 91. The motors 98, 98' are of the reversible electric type operated under the control of reversing switches (not shown) to selectively rotate the screw shafts 91, 91' in either direction for raising and lowering the respective position sensing rods.

Figure 3:
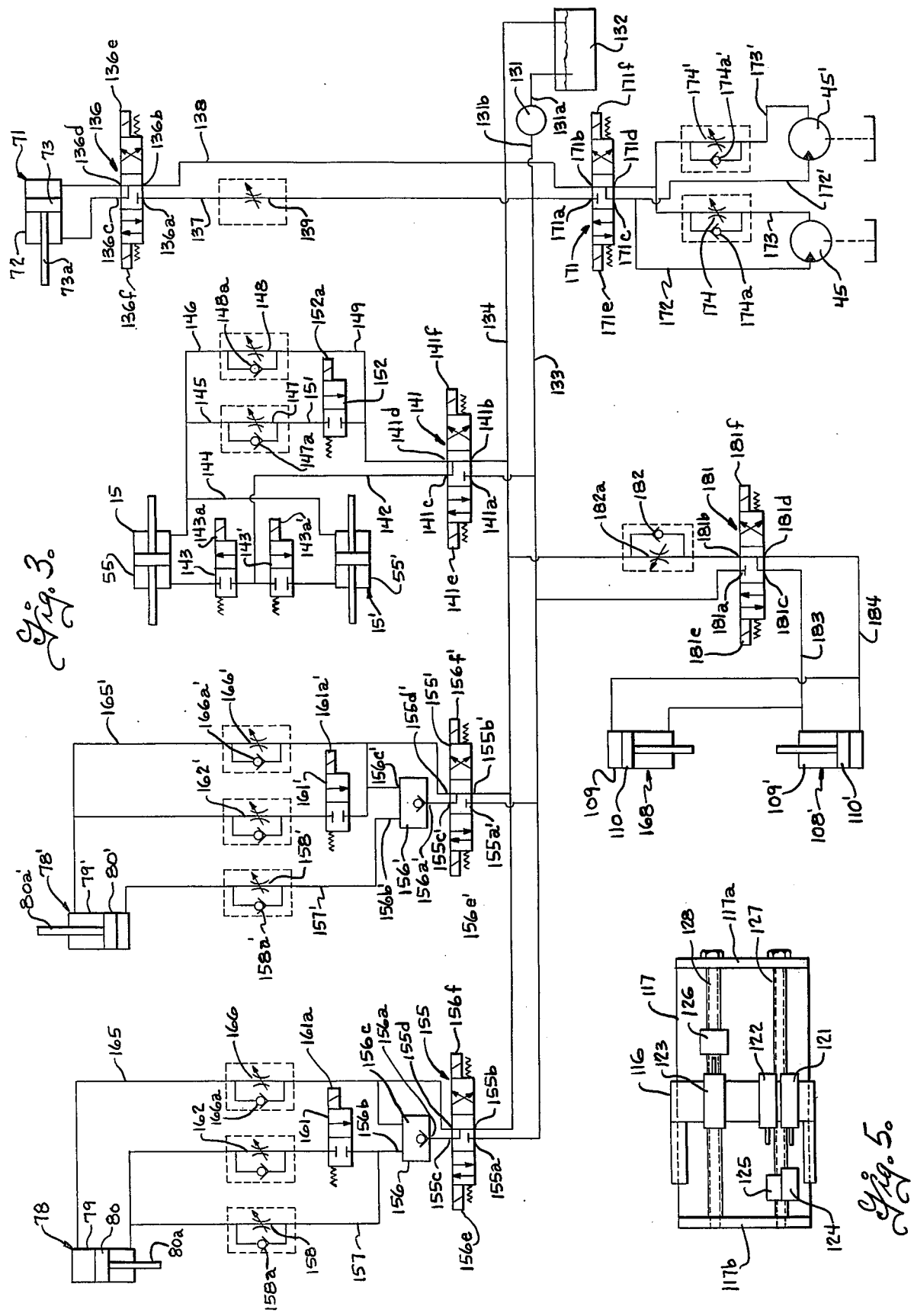
FIG. 3 is a diagrammatic view of the hydraulic circuit for the drill apparatus.

Apparatus is advantageously provided for deburring the rear side of the workpiece around the hole after it has formed by the drill 44. As shown in FIGS. 1 and 2, upper and lower deburring apparatus 101 and 101' are mounted on the respective upper and lower work engaging heads 14 and 14'. The deburring apparatus 101 and 101' are of similar construction and include deburring heads 102, 102' which are mounted as by pivots 103 on the respective work engaging head for swinging movement about a generally horizontal axis, and rotary deburring tools 104, 104' which are movable with the respective deburring head into and out of a position aligned with the drill axis, at the rear side of the workpiece. The rotary deburring tools are driven by drive motors 105, 105' through suitable gearing enclosed in the deburring heads 102, 102'. The deburring heads are normally positioned as shown in FIG. 1 spaced from the workpiece and are operated through levers 106, 106' and linkages 107, 107' by linear hydraulic actuators 108, 108'. As shown in FIGS. 1 and 3, the actuators 108, 108' include cylinders 109, 109' mounted on the gear housing 99 and pistons 110, 110' in the cylinder having their rods connected to the links 107, 107' to actuate the latter.

Upper and lower position sensing apparatus designated 115 and 115' are provided for sensing the position of the work engaging heads relative to the respective drill head. These position sensing apparatus are of like construction and like numerals followed by the postscript (') are used to distinguish parts of the lower position sensing apparatus from the corresponding parts of the upper position sensor. The position sensing apparatus include brackets 116, 116' fixed to the respective cylinder members 55, 55' and hence fixed to the respective drill heads 13, 13' and slide members 117, 117' which are slidably mounted on the brackets 116, 116' for movement relative thereto along a path paralleling the path of movement of the actuators 15, 15' and which slides are connected through members 118, 118' to rods 56b, 56b' that move with the piston 56, 56'. Since the pistons 56, 56' are movable in unison with the respective work engaging head, the relative positions of the brackets 116, 116' and the slides 117, 117' are correlative with the relative positions of the drill head and work engaging head respectively. A plurality of position sensing switches are mounted on the brackets 116, 116' and switch actuators are mounted on the slides 117, 117' as shown in FIG. 5. Three position sensing switches 121, 122 and 123 are mounted on the bracket 116, and corresponding position sensing switches 121', 122' and 123' (FIG. 4) are provided on the bracket 116'. Switch actuators 124, 125 and 126 are provided for actuating the switches 121, 122 and 123, it being understood that corresponding actuators are provided for switches 121', 122' and 123'. The switch actuators are conveniently mounted for adjustment lengthwise of the slides 117 and, for this purpose, are supported on threaded shafts 127 and 128 which are rotatably supported in end members 117a and 117b on the slide, to enable adjustment of the actuators relative to the slide by rotating the shafts 127 and 128.

Reference is now made more specifically to the hydraulic control circuit shown in FIG. 3. A hydraulic pump 131 has its inlet 131a connected to a reservoir 132 and its outlet 131b connected to a pressure delivery line 133. A return line 134 is provided for returning fluid back to the reservoir. A three-position valve 136 is provided for reversibly controlling the flow of fluid to the actuator 71 for positioning the carriage relative to the frame. Valve 136 has inlet and return ports 136a and 136b respectively connected through lines 137 and 138 to the pressure and return lines 133 and 134, and valve 136 has controlled outlet ports 136a and 136d respectively connected to opposite ends of the cylinder 72. Valve 136 is normally biased to a neutral position shown in FIG. 3 and is selectively operable to forward and reverse positions by solenoid actuators 136e and 136f. As diagrammatically shown in FIG. 3, valve 136 is operative in its neutral position to block the inlet port 136a and to connect the controlled outlet ports 136c and 136d with each other and with the outlet port 136b so that the piston 73 can float axially in the cylinder 72, when the valve is in its neutral position. An adjustable flow control valve 139 is provided in the line 137 to regulate the flow of hydraulic fluid to the linear actuator 71 and thereby control the rate of movement of the carriage along the frame.

The actuators 15 and 15' for moving the upper and lower work engaging heads relative to their respective drill heads, are advantageously controlled by a single flow control valve 141. Valve 141 has inlet and outlet ports 141a and 141b respectively connected to the pressure and return lines 133 and 134, and controlled outlet ports 141c and 141d. Controlled outlet port 141c is connected through a line 142 and through two-position, normally closed valves 143 and 143' to one end of the cylinders 55, 55' of the actuators 15 and 15'. Valves 143 and 143' are normally biased to their closed position to block flow to or from the end of the respective cylinder and are selectively operable to their open position by solenoid actuators 143a and 143a'. The other ends of the cylinders 55, 55' of the actuators 15 and 15' are connected to each other by a line 144 and are also connected through lines 145 and 146 to adjustable flow control valves 147 and 148. Valve 148 is connected through a line 149 to the controlled outlet port 141d of the valve 141, and flow control valve 147 is connected by a line 151 and normally closed two-position valve 152 in parallel with valve 148. Valve 152 is normally biased to its closed position blocking flow through line 151 and is selectively operated to its open position by a solenoid actuator 152a. Check valves 147a and 148a are respectively connected parallel with the flow control valves 147 and 148 and are arranged to open for free flow of fluid to the linear actuator 71 and to close so that return flow from the actuator passes through the respective flow control valve. As will be seen, flow control valves 147 and 148 are hydraulically connected in parallel and, when the valve 152 is closed, return flow from the actuators 15 and 15' is limited by the flow control valve 148 and, when the valve 152 is open, return flow from the actuators 15 and 15' is controlled by the combined rates of flow through the flow control valves 147 and 148. Control valve 141 is operative in its neutral position shown in FIG. 3 to block the inlet port 141a and communicate the controlled outlet ports 141c and 141d with each other. The valve is selectively operable to flow in reversible positions by electro-responsive actuators 141e and 141f.

The actuators 78 and 78' for vertically positioning the upper and lower drill units relative to the carriage, are operated under the control of individual valves 155 and 155'. Valves 155 and 155' are of like construction and include inlets 155a, 155a' and outlets 155b, 155b' respectively connected to the pressure and return lines 133 and 134, and controllec outlets 155c, 155d and 155c', 155d'. Controlled outlets 155c, 155c' are connected through pilot operated check valves 156, 156', having inlets 156a, 156a', controlled outlets 156b, 156b', and a pilot port 156c. The controlled outlets 156 b' are connected through lines 157, 157' and flow control valves 158, 158' to one end of the respective cylinders 79, 79', and the controlled outlet ports 156b are also connected through normally closed valves 161, 161' and flow control valves 162, 162' to the same end of the cylinder 79' that the flow control valves 158, 158' are connected. Check valves 158a and 158a' are connected in parallel with the flow control valves 158 and 158' respectively and are arranged to open for flow to the cylinder and to close so that return flow from the cylinder is controlled by a flow control valve. Check valves 162a and 162a' are respectively connected in parallel with flow control valves 162 and 162' and arranged to open for free flow to the cylinders. Valves 161, 161' are normally biased to their closed position blocking flow through flow control valves 162, 162' and are selectively operable to their open position by solenoid actuators 161a, 161a'. The other end of the cylinders 79, 79' are connected through lines 165, 165' and flow controllers 166, 166' to the controlled outlet port 155d of valve 155 and also to the pilot control port 156c of the valve 156. Check valves 166a, 166a' are connected in parallel with flow controller 166, 166' and are arranged to open for flow to the end of the cylinder and to close so that flow from the other cylinder is controlled by controller 166, 166'. Valves 155 and 155' are respectively moved from their neutral position shown in FIG. 3 to a forward and reverse position by electro-responsive actuators 156e and 156f and 156e' and 156f'.

The drill motors 45 and 45' are operated under the control of the valve 171 having controlled inlet ports 171a and 171b respectively connected to the pressure and return lines 133 and 134, and controlled outlet ports 171c and 171d. Controlled outlet port 171c is connected through lines 172 and 172' to the hydraulic motors 45 and 45' and the hydraulic motors are otherwise connected through lines 173, 173' and flow controllers 174, 174' to the outlet controlled outlet port 171d. The valve 171 in its neutral position blocks the inlet port and connects the controlled outlet ports 171c and 171d with each other and with the return port 171b, and the valve is selectively operable to forward and reverse positions by electro-responsive actuators 171e and 171f. Check valves 174a and 174a' are connected in parallel with the flow controllers 174 and 174' and arranged to open for flow to the motors to drive the same in a reverse direction at a high speed and to close so that return flow from the motors during forward operation is controlled by the flow controllers 174 and 174'.

The actuators 108 and 108' for the deburring tools are operated under the control of a single control valve 181. Valve 181 has inlet and return ports 181a and 181b respectively connected to the pressure and return lines 133 and 134 and a flow control valve 182 is interposed between the return port 181b and the return line 134 to meter out the flow of fluid from the cylinders. A check valve 182a is connected in parallel with regulator 182 and arranged to close during return flow and to open for flow to the cylinders. One controlled outlet port 181c of the valve is connected through lines 183 to one end of both cylinders 109 and 109' and the other controlled outlet port 181d is connected through lines 184 to the other ends of the cylinders of both actuators 108 and 108'. The valve is normally biased to its neutral position shown in FIG. 3 where it blocks the inlet port 181a and connects the controlled outlet ports 181c and 181d with the return line, and the valve 181 is selectively movable to a forward and reverse position by actuators 181e and 181f.

Figure 4:
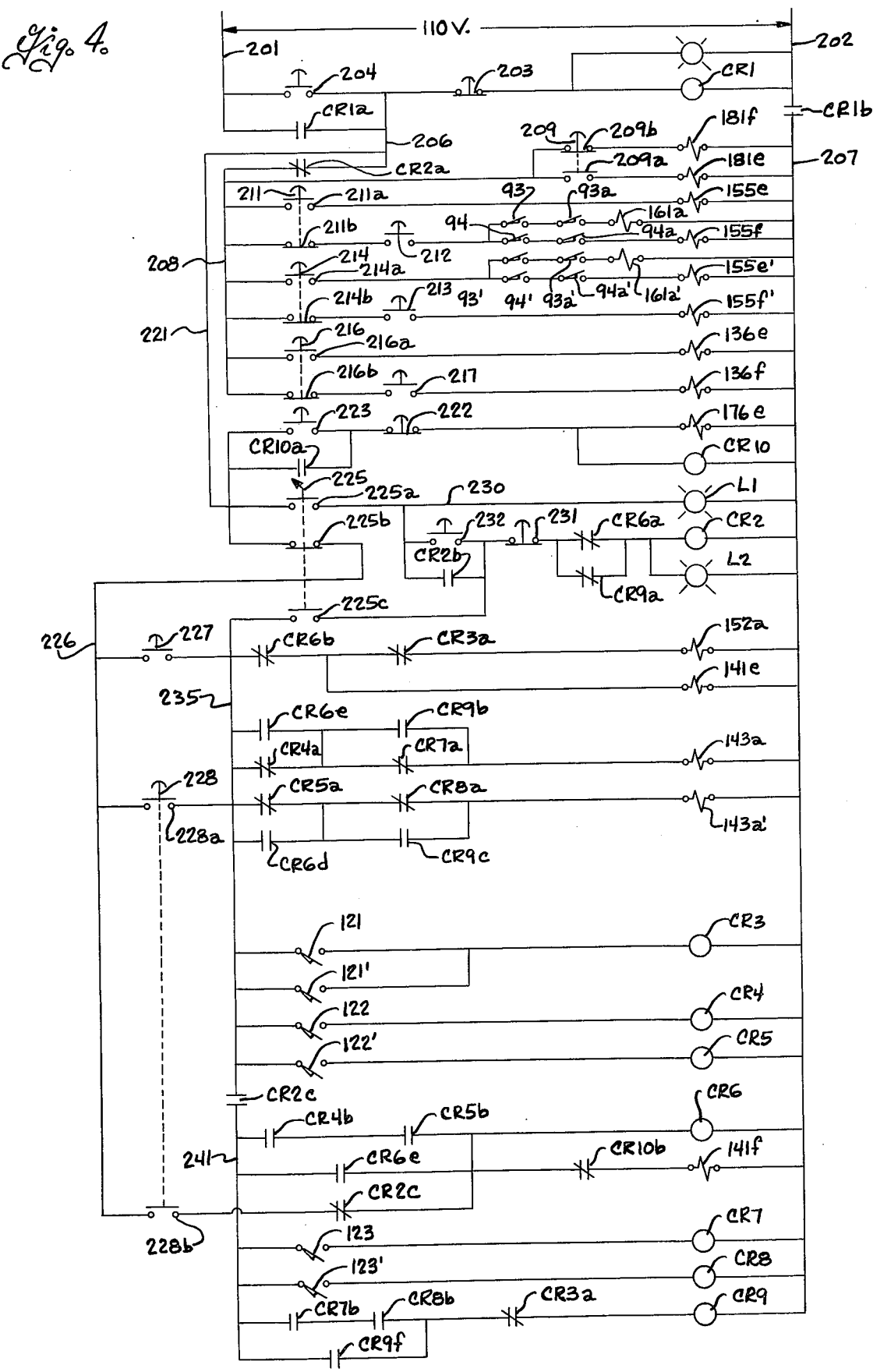
FIG. 4 is a schematic diagram of the electrical control circuit for the drill apparatus.

Reference is now made more specifically to the electrical control circuit in FIG. 4. Power supply conductors 201 and 202 are adapted for connection to an AC power supply source. A relay CR1 is connected in series with a normally closed stop switch 203 and a normally open start switch 204 so that the relay is energized when the start switch is closed. Relay CR1, when energized, closes normally open contacts CR1a and CR1b. Contacts CR1a are connected in parallel with normally open start switch 204 and, when closed, establish a holding circuit to maintain the relay CR1 energized until the stop switch 203 is opened. Contacts CR1a, when closed, also operate to apply power to conductor 206 and contact CR1b when closed, apply power to conductor 207. Conductor 206 is connected to normally closed relay contact CR2a of relay CR2 to a conductor 208. The solenoids 181e and 181f for valve 181 are respectively connected in series with normally open contacts 209a and normally closed contacts 209b of a manually operable switch 209 in a circuit that extends between conductors 207 and 208. Normally closed contacts 209b thus energize the solenoid 181f to move the deburring tool to a normally raised position and, when the switch 209 is operated, contacts 209b are opened and contacts 209a are closed to operate the solenoid 181e and move the valve to a position to lower the deburring tool.

Solenoid 155e for valve 155 is connected in a series circuit with normally open contacts 211a of switch 211, between conductors 207 and 208 so that solenoid 155e is energized when switch 211 is operated to thereby move valve 155 to a position supplying fluid under pressure to the underside of the piston 80 to raise the upper drill head. Pilot operated check valve 156 operates, when the valve 155 is moved back to its neutral position, to hold the upper drill head in a raised position. Actuator 155f for valve 155 is connected in a series circuit with normally closed limit switches 94, 94a, normally open manually operable switch 212, and the normally closed contacts 211b of switch 211. Thus, when switch 211 is in its normal position shown in FIG. 4, and switch 212 is closed, valve 155 is operated to a position supplying fluid under pressure to the upper end of the cylinder 79 of the actuator 78 to lower the upper drill head. The flow of fluid from the lower end of the cylinder is controlled by a flow restrictor 158. In order to enable relatively rapid initial lowering of the upper head, the solenoid 161a for valve 161 is connected in a series with normally closed limit switches 93 and 93a, so as to also be energized when switch 212 is closed. This allows a relatively more rapid return of fluid from the lower end of the upper actuator through both flow restrictors 158 and 162, until one of the limit switches 93, 93a, is operated to its open position. Thereafter, the head will continue to move downwardly but at a slower rate under control of flow restrictor 158 until one of the limit switches 94, 94a is operated to its open position. Switches 94 and 94a are operated by the rods 86, 86a when the work engaging head and drill reach a preselected position relative to the workpiece, and switches 93, 93a are operated by the rods 86, 86a at a position slightly in advance of the aforementioned position. The actuator 78' for the lower drill unit is operated in a similar manner under the control of valves 155' and 161'. Thus, solenoid 155f' for valve 155' is connected in a series circuit with normally open manually operable switch 213 and the normally closed contacts 214b of switch 214. Closing of switch 213 thus energizes solenoid 155f' and moves valve 155' to a position supplying fluid under pressure to the upper side of the piston 80 in the actuator 78' to move the lower drill unit to its lower position. The pilot operated check valve 156' holds the lower drill unit in its lower position, when the valve 155' returns to its neutral position. Solenoid 155e' for valve 155' is connected in a series circuit with normally closed limit switches 94' and 94a', and with the normally open contacts 214a of switch 214 so that the lower head is moved toward its raised position, when switch 214 is moved to a position closing contacts 214a. In order to enable initial relatively rapid movement of the lower head to its raised position, the solenoid 161a' for valve 161' is connected in series with limit switches 93' and 93a', to move valve 161' to its open position until one of the limit switches 93', 93a' is opened. Switches 94' and 94a' are operated by the lower workpiece sensing rods 86' and 86a' when the work engaging head and drill head reaches a preselected raised position relatively to the workpiece, and switches 93' and 93a' are operated slightly in advance of that position.

Solenoid 136e for valve 136 is connected in series with the normally open contacts 216a to be actuated in response to closing of the switch contacts 216a. This moves the valve 136 to its forward position supplying fluid under pressure to the right hand side of the piston 73 to move the carriage forwardly until the switch 216 is released. Solenoid 136f of valve 136 is connected in a series with normally open manually operable switch 217 and the normally closed contacts 216b of switch 216. Thus, the carriage will be retracted when switch 217 is closed and will continue to retract until switch 217 is released.

Relay contacts CR1a when closed, also apply power to a conductor 221. Solenoid 176e for valve 176 is connected in a series circuit with normally closed, manually operable drill stop switch 222 and normally open drill start switch 223, between conductors 221 and 207. When the drill start switch 223 is closed, it energizes solenoid 171e and moves the valve to a forward position supplying fluid to both the upper and lower drill motors 45 and 45'. It also energizes control relay CR10 which, when energized, closes normally open relay contacts CR10a connected in parallel with the start switch 223, to maintain the drill motors energized until the stop switch 222 is opened. A manual-automatic switch 225 has contacts 225b which are closed in the manual position of the switch 225 to apply power from conductor 221 to a conductor 226. A normally open, manually operable drill advance switch 227 is connected to conductor 226 and is operable in a manner described hereinafter to enable manual advance of the drill and work heads toward each other. Normally open contacts 228a and 228b of a manually operable drill retract switch 228 are also connected to conductors 226 to enable selective retraction of the drill carriage, as described more fully hereinafter.

Manual-automatic switch 225 has contacts 225a connected to conductor 221 and which are closed when the switch is in its automatic position to apply power to a conductor 230 which energizes an indicator light L1 to indicate that the machine is in its automatic mode. A controlled relay CR2 is connected in a series circuit including parallel connected normally closed relay contacts CR6a and CR9a, normally closed manually operable cycle stop switch 231 and normally open manually operable cycle start switch 232, which series circuit extends between conductors 230 and 207. Relay CR2 is thus energized when the start switch 232 is closed and relay CR2 operates to close normally open contacts CR2b connected in parallel with the start switch 232 to provide a holding circuit. Light L2 is energized when control relay CR2 is energized to indicate that the automatic cycle is enabled. In addition, relay CR2 when energized, opens normally closed contacts CR2a to interrupt power to the carriage and drill head positioning controls. Manual-automatic switch 225 also has contacts 225c which are closed in the automatic position thereof and which establish a circuit from the relay contacts CR2b to conductor 235. The solenoid 152a for valve 152 is connected in series with normally closed relay contacts CR3a and CR6b between conductors 207 and 235 so that valve 152 is moved to its open position to enable coarse feed. In addition, solenoid 141e for valve 141 is connected in series with normally closed relay contacts CR6b between conductors 207 and 235 so that valve 141 is moved to its forward feed position to supply fluid under pressure to the line 142. Normally open relay contacts CR6c and CR4a are connected in parallel to each other, and normally open contacts CR9b and normally closed relay contacts CR7a are also connected in parallel to each other and in series with the contacts CR6e and CR4a and with the solenoid 143a of valve 143. Normally closed relay contacts CR5a and normally open relay contacts CR6d are connected in parallel with each other, and normally closed relay contacts CR8a and normally open relay contacts CR9c are also connected in parallel with each other and in series with the relay contacts CR5a and CR6d, and in series with the solenoid 143a' for the valve 143'.

Relay CR3 is connected in series with parallel connected normally open limit switches 121 and 121' so as to be energized when either of the switches is closed, and relay CR3, when energized, opens normally closed relay contacts CR3a to de-energize solenoid 152a and allow feed rate control valve 152 to close, thereby reducing the rate of feed. Relay CR4 is connected in a series circuit with normally open limit switch 122 in a circuit that extends between conductors 235 and 207, and relay CR5 is connected in a series circuit with a normally open limit switch 122' in a circuit that extends between conductors 235 and 207. Relay CR2, when energized, closes relay contacts CR2c and this establishes a circuit from conductor 235 to conductor 241. Normally open relay contacts CR4b and CR5b are connected in series with each other and in parallel with normally open relay contacts CR6e, and the aforementioned circuit is connected to the relay CR6 and also to a series circuit including normally closed relay contacts CR10b and the solenoid 141f of valve 141. Relay CR7 is connected in series with a normally open limit switch 123 in a circuit that extends between conductors 241 and 207 and relay CR8 is similarly connected in series with a limit switch 123' in a circuit that extends between conductors 241 and 207. Normally open relay contacts CR7b and CR8b are connected in series with each other and in parallel with normally open relay contacts CR9f and the aforementioned circuit is connected in series with normally closed contacts CR3a and relay CR9.

From the foregoing it is felt that the construction and operation of the drill apparatus will be readily understood. The carriage 11 can be selectively advanced (to the left as viewed in FIG. 1) by operating switch 216 and can be selectively retracted (to the right as viewed in FIG. 1) by operating switch 217, which switches operate solenoids 136e and 136f for valve 136 to reversibly supply fluid to the linear carriage actuator 71. The upper and lower drill units are normally in their raised and lowered positions respectively during shifting of the carriage into position relative to the workpiece and, when the carriage is moved horizontally to a position in which the work engaging faces 51b and 52b straddle the part of the workpiece to be drilled, the upper and lower drill heads are then respectively lowered and raised to vertically position the drill units relative to the workpiece. The upper drill unit is lowered in response to closing of switch 212 which operates solenoids 155f and 161a of valves 155 and 161 to effect an initial relatively rapidly lowering of the head until one of the limit switches 93, 93a is operated by the workpiece sensing rod 86, at which time the head continues to lower but at a slower rate until the other limit switches 94, 94a' are operated by the workpiece sensing rods 86, 86a. The lower head is similarly raised in response to operation of the switch 214 to vertically position the lower head relative to the workpiece. The drill motors 45 can then be started by operating switch 223 and, assuming the manual-automatic switch 225 is in its automatic position, the drill cycle can be started by closing switch 232 which operates to energize relays CR2. Solenoids 152a and 141e of valves 152 and 141 are initially operated to cause a relatively rapid or coarse feed of the work engaging heads towards the respective drill heads to first bring the work engaging faces 151b and 151b' of the working engaging heads into engagement with the respective rear facing surfaces of the workpiece and to thereafter advance the drills into the workpiece. Control relay CR3 is operated under the control of limit switches 121 and 121' which are operated when the work engaging faces on the upper and lower work engaging heads respectively reach a position relative to the tip of the drills at which the drill is about to break through the rear side of the workpiece. These switches are closed at this point and operate relay CR3 to de-energize the solenoid 152a for valve 151a and reduce the feed rate of the drill heads. The feed of the drill heads thereafter continues at a slower rate until relay CR6 is energized. Limit switch 122 is arranged to sense when the work engaging surface on the upper work engaging head reaches the end of its advance stroke and similarly the limit switch 122' is arranged to sense when the work engaging surface on the lower work engaging head reaches the end of its stroke relative to the lower drill. Switches 122 and 122' respectively operate relays CR4 and CR5 and when both relays CR4 and CR5 are operated, the relay CR6 is operated to open the circuit to the forward feed and stop the forward feed of the actuators 55. Actuation of relay CR6 also completes a circuit to the actuator 141f to effect automatic reversal of the drill feed. Limit switches 123 and 123' respectively sense when the upper and lower work engaging members reach their retracted position and respectively operate control relay CR7 and CR8. When both control relays CR7 and CR8 are energized, they complete a circuit to control relay CR9 and indicate completion of the cycle.

Manual advance and retraction of the drill can be effected by manually operable advance switch 227 which is connected between conductors 226 and 235 and by manually operable retract switch 228 having contacts 228a connected between conductors 226 and 235 and contacts 228b connected between conductors 226 and through normally closed relay contacts CR2c to the relay CR6.

From the foregoing it will be seen that it is only necessary to accurately position the workpiece in the direction of its length, and the drill units can be moved horizontally parallel to the drill axis to horizontally position the drill units relative to the workpiece and the drill units thereafter move vertically relative to the workpiece to vertically position the drill units relative to the workpiece. When the drill units are horizontally and vertically positioned relative to the workpiece, the valve 136 is returned to its neutral position shown in FIG. 3 in which valve 136 communicates opposite ends of the cylinder 72 with each other and with the return line 134 to allow free floating of the carriage relative to the frame. Further, the work engaging heads directly engage the rear side of the part of the workpiece being drilled and, when the feed mechanism relatively moves the work engaging heads and drill heads in a direction paralelling the drill axis, it operates to initially bring the same into contact with relatively opposite surfaces on the workpiece and thereafter advance the drill into the workpiece. With this arrangement, the forces exerted on the workpiece during the drilling operation in a direction crosswise of the workpiece are localized to the area engaged by the work engaging head and drill so that distortion or deflection of the workpiece is minimized. Further, it is unnecessary to provide heavy duty clamps to clamp the workpiece against lateral movement or to provide a heavy frame for supporting the carriage. In addition, since the work engaging head directly engages the rear side of the workpiece, the position sensing switches 121–123 and 121'–123', which sense the relative position of the work engaging head and drill heads, can be utilized to control both the rate of movement of the feed mechanism, to decrease the rate of movement at the point where the drill is about to break through the rear side of the workpiece, and to also control the direction of movement of the drill and feed heads to effect automatic retraction of the drill. The deburring tool is advantageously mounted on the work engaging head and can be selectively moved into and out of position aligned with the drilled hole at the rear side of the workpiece to deburr the hole.

The embodiments of the invention in which an exclusive property or privilege is claimed are defined as follows:

1. An apparatus for drilling holes in a workpiece comprising: a stationary support frame, work locating means for locating a workpiece relative to the stationary support frame, a drill carriage mounted on the stationary support frame for movement relative thereto along a linear path, a drill head mounted on the carriage and having drill means rotatable about an axis paralleling said linear path, a work engaging head mounted on said drill head for movement relative thereto along a feed path paralleling said linear path, said work engaging head having a first work engaging face opposing the drill means, feed means connected to said drill head and to said work engaging head for selectively moving the latter along said feed path in drill feed and drill retracting directions, said feed means being operative in said drill feed direction to bring the drill means and the first work engaging face on the work engaging head into engagement with respective front and rear facing surfaces on the workpiece and to thereafter advance the drill means into the workpiece, said drill carriage being freely movable along said linear path relative to the support frame during movement of said first work engaging head relative to the drill head by said feed means.

2. An apparatus for drilling holes in a workpiece according to claim 1 wherein said work engaging head has a second work engaging face spaced from and opposed to said first work engaging face for engaging the front facing surface on the workpiece when the feed means is operated in said drill retracting direction to retract the drill means from the workpiece.

3. An apparatus for drilling holes in a workpiece according to claim 2 including position sensing means operatively connected to the work engaging head to said drill head for sensing when the work engaging head reaches a preselected position relative to said drill head, and means responsive to said position sensing means for controlling operation of said feed means between said drill feed direction and said drill retracting direction.

4. An apparatus for drilling holes in a workpiece according to claim 1 wherein said feed means includes means for moving said work engaging head relative to said drill head in said drill feed direction at different rates, position sensing means operatively connected to said work engaging head and to said drill head for sensing when the work engaging head reaches a preselected position relative to said drill head, and means responsive to said position sensing means for controlling operation of said feed means to change the rate of movement of said work engaging head relative to said drill head in said drill feed direction.

5. An apparatus for drilling holes in a workpiece according to claim 1 wherein said feed means is operative to move said first work engaging head in said drill feed direction at different rates, first and second sensing means operatively connected to said work engaging head and to said drill head for sensing when the work engaging head reaches first and second positions relative to said drill head, means responsive to said first position sensing means for controlling operation of said feed means to change the rate of movement of said work engaging head in said drill feed direction, and means responsive to said second position sensing means for controlling operation of said feed means between said drill feed direction and said drill retracting direction.

6. An apparatus for drilling holes in a workpiece according to claim 1 including a second cutting means having an axially rotatable deburring tool, means mounting said second cutting means on said work engaging head for movement of said deburring tool between a retracted position spaced from the workpiece and a work engaging position with the axis of the rotary cutting member substantially aligned with the axis of said drill means at said rear facing surface of the workpiece.

7. An apparatus for drilling holes in a workpiece according to claim 1 wherein said drill head is mounted on said carriage for adjustment relative thereto along a second path perpendicular to said linear path.

8. An apparatus for drilling holes in a workpiece according to claim 7 including power operated means for moving said drill head along said second path relative to said carriage, workpiece sensing relay mounted on said work engaging head for sensing when the work engaging head has been moved with said drill head along said second path to a preselected position relative to the workpiece and means responsive to said workpiece sensing means for controlling said power operated means.

9. An apparatus for drilling holes in a workpiece according to claim 1 wherein said linear path and said feed path are generally horizontal.

10. An apparatus for drilling holes in a workpiece according to claim 1 including a cylinder and piston type hydraulic actuator operatively connected to said stationary frame and to said drill carriage, fluid control means for controlling operation of said hydraulic actuator, said fluid control means including valve means operative in a neutral position thereof to provide substantially free communication between opposite ends of said cylinder to allow free floating of the piston therein, said valve means being selectively operable to first and second other positions for respectively moving the carriage in first and second directions relative to the frame to position the same relative to the workpiece.

11. An apparatus for drilling holes in a workpiece according to claim 1 wherein said feed means comprises a double acting linear hydraulic actuator having cylinder means operatively connected to said drill head and piston means operatively connected to said work engaging head, fluid control means for controlling operation of said hydraulic actuator, said fluid control means including speed change means actuatable to change the rate of flow of fluid to said cylinder means, position sensing means operatively connected to said work engaging head and to said drill head for sensing when said work engaging head reaches a preselected position relative to said drill head, and means responsive to said position sensing means for actuating said speed change means.

12. An apparatus for drilling holes in a workpiece comprising: a stationary support frame, work locating means for locating a workpiece relative to the stationary support frame, a drill carriage mounted on the stationary support frame for linear shifting movement relative thereto along a generally horizontal path, a drill head mounted on the carriage and having drill means rotatable about an axis paralleling said horizontal path, a work engaging head mounted on said drill head for movement relative thereto along a linear feed path paralleling said horizontal path, said work engaging head having a first work engaging face opposing the drill means, double acting linear hydraulic actuator means including cylinder and piston means connected to said drill and work engaging heads for relatively moving the same along said linear feed path, fluid control means for controlling operation of said linear hydraulic actuator means and including valve means for reversibly controlling the flow of fluid to said cylinder means to move the drill head and work engaging head toward and away from each other respectively in drill feed and drill retracting directions, said linear hydraulic actuator means being operative in said drill feed direction to bring the drill means and the first work engaging face on the work engaging head into engagement with respective front and rear facing surfaces on the workpiece and to thereafter advance the drill means into the workpiece, said drill carriage being freely movable along said horizontal path relative to the support frame during movement of said work engaging head relative to the drill head by said linear hydraulic actuator means.

13. An apparatus for drilling holes in a workpiece according to claim 12 including position sensing means operatively connected to the drill head and work engaging head for sensing when the latter reaches a preselected position relative to the drill head, and means responsive to said position sensing means for operating said valve means from a drill feed to said drill retracting position, said work engaging head having a second work engaging face opposed to the first work engaging face for engaging the front facing surface of the workpiece when the drill head and work engaging head are moved in said drill retracting direction.

14. An apparatus for drilling holes in a workpiece according to claim 13 wherein said fluid control means includes speed change means actuatable to change the rate of flow of fluid to said cylinder means, a second position sensing means operatively connected to said drill head and said working engaging head and operative when said work engaging head reaches a second preselected position relative to the drill head for actuating said speed change means.

15. An apparatus for drilling holes in a workpiece according to claim 12 including a second hydraulic actuator having cylinder and piston means operatively connected to said stationary frame and to said drill carriage, a second fluid control means for controlling operation of said second hydraulic actuator, said fluid control means including second valve means operative in a neutral position thereof to provide substantially free communication between opposite ends of the cylinder means of the second hydraulic actuator to allow free floating of the piston means thereon, said second valve means being selectively operable to first and second other positions for respectively moving the drill carriage in first and second opposite directions relative to the frame to position the same relative to the workpiece.

16. An apparatus for drilling holes in a workpiece according to claim 12 wherein said drill head is mounted on said carriage for vertical adjustment relative thereto.

17. An apparatus for drilling holes in a workpiece according to claim 16 including power operated means for vertically adjusting said drill head relative to said drill carriage, workpiece sensing mounted on the work engaging head for sensing when the work engaging head has been vertically adjusted with said drill head to a preselected position relative to the workpiece, and means responsive to said workpiece sensing means for controlling said power operated means.

18. An apparatus for drilling holes in a workpiece according to claim 12 including a second cutting means having an axially rotatable deburring tool, means mounting said second cutting means on said work engaging head for movement of said deburring tool between a retracted position spaced from the workpiece and a work engaging position with the axis of the rotary cutting member substantially aligned with the axis of said drill means at said rear facing surface of the workpiece.

19. An apparatus for drilling holes in a workpiece comprising: a stationary support frame, work locating means for locating a workpiece relative to said stationary support frame, a drill carriage mounted on the stationary support frame for shifting movement relative thereto along a generally horizontal path, said carriage having vertical guideways thereon, upper and lower drill heads mounted on said vertical guideways for vertical adjustment relative to the carriage, said upper and lower drill heads respectively having upper and lower drill means rotatable about an axis paralleling said horizontal path, upper and lower work engaging heads respectively mounted on said upper and lower drill heads for movement relative thereto along upper and lower linear feed paths paralleling said horizontal path, said upper and lower work engaging heads each having a first work engaging face opposing the respective upper and lower drill means, upper linear hydraulic actuator means including double acting cylinder and piston means connected to the upper drill head and upper work engaging head for relatively moving the same along said upper linear feed path, lower linear hydraulic actuator means connected to the lower drill head and lower work engaging head for relatively moving the same along said lower linear feed path, and fluid control means for controlling operation of said upper and lower linear hydraulic actuators.

20. An apparatus for drilling holes in a workpiece according to claim 19 wherein said fluid control means includes a single flow reversing valve for reversibly controlling the flow of fluid to both the upper and lower hydraulic actuators.

21. An apparatus for drilling holes in a workpiece according to claim 20 wherein said fluid control means includes speed change means common to both the upper and lower hydraulic actuators actuatable to change the rate of flow of fluid to the cylinder means of both the upper and lower hydraulic actuators, and position sensing means operative when either said upper or lower drill head reaches a preselected position relative to its respective work engaging head for actuating said speed change means.

* * * * *